United States Patent
Henky et al.

(10) Patent No.: US 10,962,689 B2
(45) Date of Patent: Mar. 30, 2021

(54) OPHTHALMIC LENS COMPRISING A REFLECTIVE ANTI-ABRASION MULTILAYER COATING AND PROCESS FOR MANUFACTURING SAID LENS

(71) Applicant: ESSILOR INTERNATIONAL, Charenton-le-Pont (FR)

(72) Inventors: Francis Henky, Charenton-le-Pont (FR); Maud Fraboulet, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 85 days.

(21) Appl. No.: 16/326,563

(22) PCT Filed: Aug. 18, 2017

(86) PCT No.: PCT/FR2017/052244
§ 371 (c)(1),
(2) Date: Feb. 19, 2019

(87) PCT Pub. No.: WO2018/033687
PCT Pub. Date: Feb. 22, 2018

(65) Prior Publication Data
US 2019/0227197 A1 Jul. 25, 2019

(30) Foreign Application Priority Data
Aug. 19, 2016 (FR) ...................................... 16 57818

(51) Int. Cl.
*G02C 7/10* (2006.01)
*G02B 1/14* (2015.01)
(Continued)

(52) U.S. Cl.
CPC ............... *G02B 1/14* (2015.01); *G02B 5/208* (2013.01); *G02B 5/282* (2013.01); *G02B 5/283* (2013.01); *G02C 7/107* (2013.01); *G02C 2202/16* (2013.01)

(58) Field of Classification Search
CPC . G02C 7/10; G02B 1/041; G02B 1/14; G02B 2202/16
(Continued)

(56) References Cited

U.S. PATENT DOCUMENTS

| 7,055,954 B2 | 6/2006 | Marechal | |
|---|---|---|---|
| 2015/0198821 A1* | 7/2015 | Miyamoto | ........... G02B 5/0891 351/159.62 |
| 2017/0219848 A1* | 8/2017 | Kraus | ................ G02B 27/0012 |

FOREIGN PATENT DOCUMENTS

| FR | 2365813 | 4/1978 |
|---|---|---|
| JP | S56-113101 | 9/1981 |

(Continued)

OTHER PUBLICATIONS

International Search Report and Written Opinion issued in International Patent Application No. PCT/FR2017/052244, dated Nov. 30, 2017.

(Continued)

*Primary Examiner* — Darryl J Collins
(74) *Attorney, Agent, or Firm* — Norton Rose Fulbright US LLP

(57) ABSTRACT

The present invention relates to an ophthalmic lens (L6) comprising a substrate (1) having a front main face and a rear main face, the front main face being surmounted by a multilayer inorganic coating (2) that has an average luminous reflectance factor Rv in the visible equal to or higher than 4% and that consists of a stack comprising:

Figure 4:
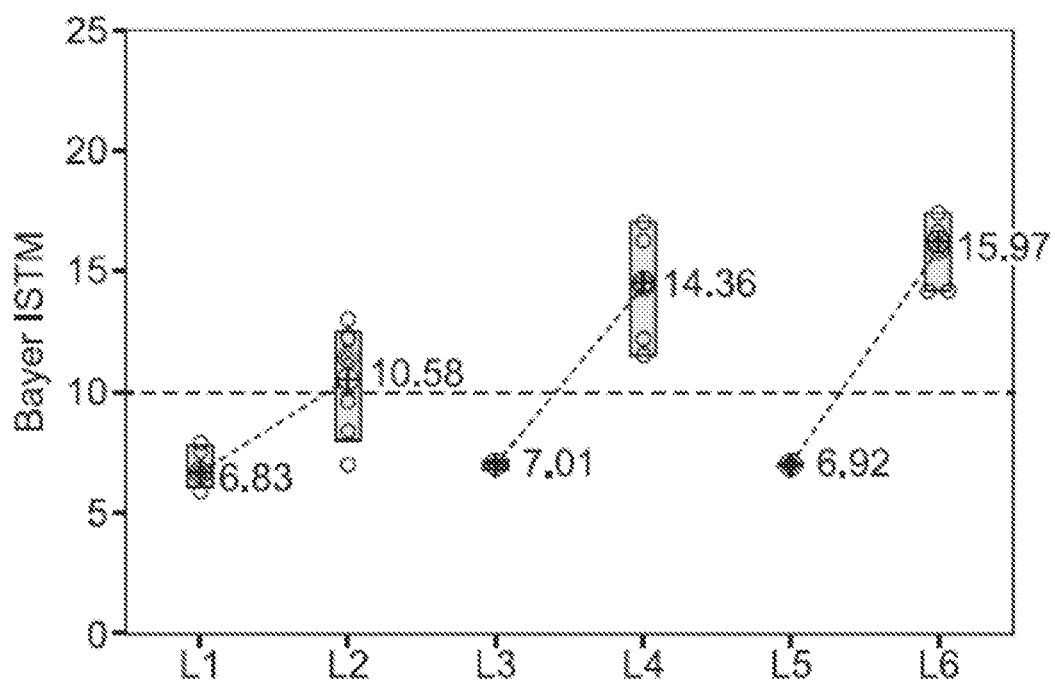

at least two low-refractive-index layers that each consist of a first material of refractive index lower than 1.55, and (Continued)

at least one high-refractive-index layer that consists of a second material of refractive index higher than 1.55 and that is located between two said low-index layers that are adjacent in said stack, characterized in that said coating (2) has a thickness smaller than or equal to 600 nm and a Bayer ISTM abrasion-resistance value higher than 10.

22 Claims, 2 Drawing Sheets

(51) Int. Cl.
*G02B 5/28* (2006.01)
*G02B 5/20* (2006.01)

(58) Field of Classification Search
USPC .................................. 351/44, 159.6, 159.62
See application file for complete search history.

(56) References Cited

FOREIGN PATENT DOCUMENTS

| JP | 2003-098309 | 4/2003 |
| WO | WO 2008/000841 | 1/2008 |
| WO | WO 2008/107325 | 9/2008 |
| WO | WO 2012/173596 | 12/2012 |

OTHER PUBLICATIONS

First Office Action from the Chinese Intellectual Property Office issued in corresponding Chinese Patent Application No. 201780049816.5 dated Mar. 3, 2020.

* cited by examiner

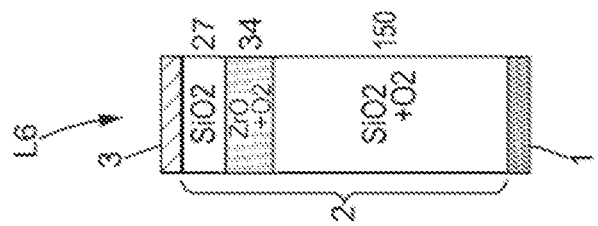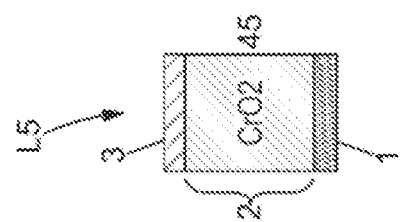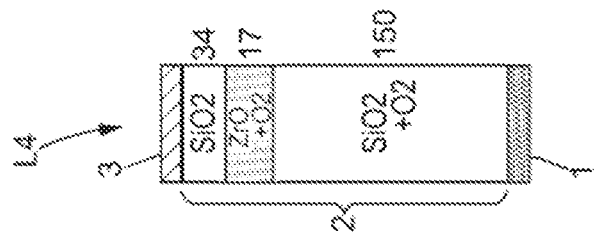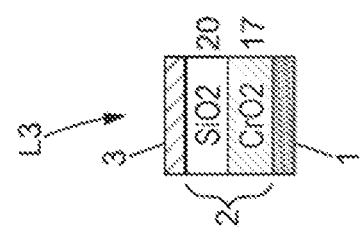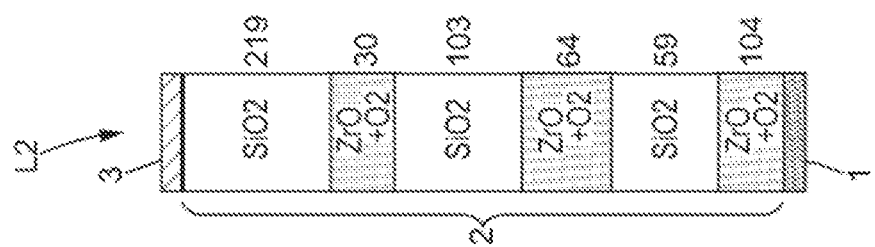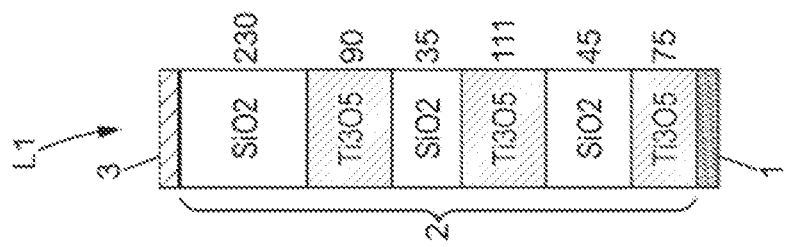

OPHTHALMIC LENS COMPRISING A REFLECTIVE ANTI-ABRASION MULTILAYER COATING AND PROCESS FOR MANUFACTURING SAID LENS

CROSS-REFERENCE TO RELATED APPLICATIONS

This application is a national phase application under 35 U.S.C. § 371 of International Application No. PCT/FR2017/052244 filed 18 Aug. 2017, which claims priority to French Patent Application No. 16 57818 filed 19 Aug. 2016. The entire contents of each of the above-referenced disclosures is specifically incorporated by reference herein without disclaimer.

The present invention relates to an ophthalmic lens of the type comprising a stack of inorganic layers surmounting a substrate and having a satisfactory abrasion resistance, and to the manufacturing process thereof. The invention in particular applies to an ophthalmic lens usable to form a (corrective or non-corrective) sunglass lens and having a reflective front face.

As known, ophthalmic lenses consist of a substrate made of thermoplastic or thermoset that is surmounted by at least one multilayer coating that is in particular designed to confer on the lens a satisfactory resistance to shocks and to scratches. However, the scratch resistance of these coatings often proves to be insufficient, this being particularly critical for lenses forming sunglass lenses having reflective front faces, in comparison with conventional or antireflection non-sunglass lenses. Specifically, the presence of scratches on the reflective front faces of sunglass lenses is particularly perceptible both to the wearer, to whom it may be a visual source of annoyance, and to an observer, for whom these scratched sunglass lenses are then unattractive.

Document JP-A-2005-292204 discloses an ophthalmic lens the substrate of which is coated with an anti-abrasion organic coating ("hard-coat layer"), that itself is covered by a multilayer inorganic coating that is intended to improve the antireflection effect on the side of the rear face of the lens without penalizing the reflective effect on its front face. This inorganic coating consists of a relatively thick stack of at least seven layers, formed by an alternation of layers of low refractive index (which are made of $SiO_2$) and of layers of high refractive index (for example made of $Ta_2O_5$), with optional insertion of a metal layer, for example made of Cr. It is mainly the anti-abrasion coating that confers on the lens the sought-after scratch resistance, as explained in § [0026], the multilayer coating surmounting it not therefore being designed to minimize the appearance of scratches on the front face of the lens. This resistance to scratches of the lens is evaluated visually and approximately in this document by means of a so-called steel wool test, with a UA evaluation called "almost no scratches" for characterizing the abrasion resistance of the tested lenses.

A major drawback of the lenses presented in this document resides in their thickness, which may be very large, for a scratch resistance that is not precisely quantified and that may prove to be insufficient in certain cases.

Document U.S. Pat. No. 7,055,954 B2 discloses a multilayer inorganic coating comprising a reflective front face for a sunglass lens, which coating also consists of an alternated stack of layers of low refractive index (made of $SiO_2$) and of high refractive index (made of $HfO_2$). This coating is designed to mask any scratches made and not to prevent them. This document does not teach how to minimize the appearance of scratches on this reflective front face for sunglass lenses.

One aim of the present invention is therefore to propose a new ophthalmic lens that remedies at least partially the aforementioned drawbacks, in particular by significantly improving the abrasion resistance of its multilayer inorganic coating while conferring thereon a small thickness.

This aim is achieved in that the Applicant has surprisingly discovered that a particular selection for a multilayer inorganic coating of at least two layers of low refractive index and of at least one layer of high refractive index, which layers are stacked in alternation, of determined thicknesses and deposited using specific processes, makes it possible to obtain, at the same time, for said coating, a sufficiently high average luminance reflectance factor Rv in the visible, a small thickness and a very high Bayer ISTM abrasion-resistance value, this lens being usable to form a sunglass lens having a reflective front face.

More precisely, an ophthalmic lens according to the invention comprises a substrate having a front main face and a rear main face, the front main face being surmounted by a multilayer inorganic coating that has an average luminous reflectance factor Rv in the visible equal to or higher than 4% and that consists of a stack comprising:
  at least two low-refractive-index layers that each consist of a first material of refractive index lower than 1.55, and
  at least one high-refractive-index layer that consists of a second material of refractive index higher than 1.55 and that is located between two said low-index layers that are adjacent in said stack,
and the lens is characterized in that the coating has a thickness smaller than or equal to 600 nm and a Bayer ISTM abrasion-resistance value higher than 10.

According to the present invention, the average luminous reflectance factor Rv in the visible domain is such as defined in standard ISO 13666:1998 and measured according to standard ISO 8980-4 (at an angle of incidence smaller than 17°, and typically of 15°). As known, it is a question of the weighted average of the spectral reflectance over all of the visible spectrum between 380 nm and 780 nm. Advantageously, this average factor Rv may be equal to or higher than 8%, or even than 15%.

Also according to the present invention, said Bayer ISTM abrasion-resistance value that furthermore characterizes said multilayer inorganic coating is measured according to standard ISTM 02-002 with an abrasive material Alundum® ZF-12, and advantageously this Bayer ISTM value of said coating according to the invention may be equal to or higher than 12, even more advantageously than 14, or even than 15.

In the present description, unless otherwise specified:
  the indication of an interval of values "from X to Y" or between "X and Y", in the present invention, is understood to mean including the values X and Y;
  the expression "to deposit a layer or a coating" means that the layer or coating is deposited on the uncovered (exposed) surface of the lens, i.e. on the surface furthest from the substrate, it being specified that by "deposited on" what is meant is "surmounting the entirety or one portion of the exposed surface" (i.e. deposited above and not necessarily in contact with this surface);
  by rear (i.e. internal) face of the substrate, what is meant is the (generally concave) face that, during use of the ophthalmic lens, is closest to the eye of the wearer and conversely, by front face of the substrate, what is meant is the (generally convex) face furthest from this eye; and all the thicknesses disclosed in the present description are physical thicknesses (i.e. not optical thicknesses), it being recalled that the physical thickness of a layer is by definition equal to its optical thickness divided by the refractive index of this layer (unless otherwise indicated, the refractive indices to which reference is made in the present description are expressed at 25° C. for a wavelength of 550 nm).

It will be noted that a coating according to the invention has, in comparison to the aforementioned reflective inorganic coatings of the prior art, on the one hand, a small thickness and therefore a sensitivity to mechanical stresses that is also low (e.g. an improved resistance to cracking) and, on the other hand, a clearly improved scratch resistance.

It will also be noted that this coating comprises at least two said low-index layers that are not consecutive in the stack (i.e. one of which does not directly cover the other) and which are joined to each other by said at least one high-index layer.

It will furthermore be noted that the very high obtained BAYER values bear witness to the fact that this coating of the invention is able to minimize the appearance of scratches on said front face. In other words, this coating allows almost by itself the appearance of scratches to be effectively opposed, contrary to the antireflection multilayer inorganic coatings presented in the aforementioned document JP-A-2005-292204. Specifically, these BAYER values were not predictable in light of the visual results obtained in JP-A-2005-292204 by the "steel wool" test, as a result of the very different abrasion conditions used for this "steel wool" test and for the Bayer test defined by standard ISTM 02-002 with the abrasive material Alundum® ZF-12 (the reader may for example refer to document WO 2015/0033182 A1 in the name of the Applicant for measurements carried out according to the "steel wool" test and according to a BAYER ISTM test).

Advantageously, said coating may be devoid of any said low-index layer of thickness larger than or equal to 225 nm, and/or any said high-index layer of thickness larger than or equal to 105 nm.

It will be noted that this thickness smaller than 225 nm for each low-index layer and/or this thickness smaller than 105 nm for the or each high-index layer sets them apart from the example coatings tested in the aforementioned document JP-A-2005-292204.

Furthermore, advantageously, said inorganic coating:
comprises at least one said low-index layer of thickness comprised between 100 nm and 200 nm and/or at least one said high-index layer of thickness smaller than or equal to 50 nm, and
is devoid of any metal layer of thickness larger than 5 nm.

It will be noted that this document JP-A-2005-292204 in contrast teaches, in a number of the tested coatings thereof, to use a metal layer made of chromium and having a thickness larger than 5 nm.

It will also be noted that said inorganic coating according to the invention may comprise one or more thin metal layers of thickness smaller than or equal to 5 nm, used in particular as adhesion promoters.

According to another feature of the invention, said coating may surmount at least one abrasion-resistant organic layer covering said substrate and may comprise:
two or three said low-index layers, and
one to three said high-index layers.

Preferably, said at least two low-index layers form at least 65% and, even more preferably, preferably at least 75% of the thickness of said coating.

According to another feature of the invention, that of said at least two low-index layers which is the closest to said substrate, or the proximal low-index layer, may have an exposed surface that is covered by a said high-index layer and that is exempt from the product of a reaction between said first material and an ion bombardment.

It will be noted that this exposed (i.e. external) surface of said proximal low-index layer is thus advantageously not subject to a prior ion bombardment before deposition of the high-index layer that covers it. By "ion bombardment" what is meant, as known, is a bombardment by ions (e.g. argon ions) of energy higher than or equal to 30 eV, and preferably higher than or equal to 40 eV, it being specified that it has been checked that this ion bombardment chemically modifies the surface thus activated of the proximal low-index layer.

Specifically, the Applicant has unexpectedly discovered that an ion bombardment (usually used to activate a low-index underlayer made of $SiO_2$ before a high-index layer, for example made of $ZrO_2$, of a antireflection or reflective multilayer coating is deposited thereon, as described in document WO 2008/107325 A1), substantially decreases the improvement in Bayer ISTM abrasion resistance, in comparison to the deposition of the same high-index layer on a low-index layer not subject to an ion bombardment. In other words, a non-activation of the exposed surface of said proximal low-index layer allows the abrasion resistance of the coating to be further increased.

It will also be noted that this absence of activation of said proximal low-index layer allows a good productivity to be maintained, because cycle times are not increased by the use of such an ion bombardment.

Advantageously, said proximal low-index layer, the exposed surface of which is exempt of the product of a reaction between said first material and said ion bombardment, may be the most internal layer of said stack and may have a thickness comprised between 100 nm and 200 nm.

According to another advantageous feature of the invention, which is coupled to this absence of ion bombardment of said proximal low-index layer, this proximal low-index layer (preferably forming the most internal layer of the stack) may result from the deposition of a precursor of said first material evaporated in a vacuum chamber with a gas introduced into said chamber that is chosen from argon, krypton, neon, oxygen and a mixture of at least two of these gases and that is preferably oxygen.

It will be noted that this introduction of this gas into the evaporation chamber during the deposition has the effect of modifying the porosity of the low-index layer thus deposited and, combined with the aforementioned absence of ion bombardment, allows the abrasion resistance of the coating to be further improved.

According to a first embodiment of the invention, said coating is made up of three layers comprising, in succession, starting from closest to said substrate:
an internal said low-index layer, of thickness preferably comprised between 120 nm and 170 nm,
an intermediate said high-index layer, of thickness preferably comprised between 10 nm and 40 nm, and
an external said low-index layer, of thickness preferably comprised between 20 nm and 40 nm,
said coating having:
a thickness smaller than 300 nm and preferably comprised between 150 nm and 250 nm, a thickness of the low-index layers at least equal to 83% and preferably at least equal to 90% of the thickness of said coating, and an average luminous reflectance factor Rv in the visible higher than 8%.

It will be noted that this thickness of the low-index layers at least equal to 83% and preferably at least equal to 90% of the thickness of said coating is equivalent to a ratio of the thickness of the low-index layers/high-index layer higher than 5 and preferably higher than or equal to 10.

According to a second embodiment of the invention, said coating comprises four to six layers comprising, in succession, starting from closest to said substrate:

an internal said high-index layer, of thickness preferably comprised between 80 nm and 120 nm, a first intermediate said low-index layer, of thickness preferably comprised between 40 nm and 80 nm, a first intermediate said high-index layer, of thickness preferably comprised between 40 nm and 80 nm, optionally a second intermediate said low-index layer, of thickness preferably comprised between 80 nm and 120 nm, optionally a second intermediate said high-index layer, of thickness preferably comprised between 20 nm and 50 nm, and an external said low-index layer, of thickness preferably comprised between 200 nm and 240 nm, said coating having:

a thickness comprised between 400 nm and 580 nm, a thickness of the low-index layers at least equal to 60% of the thickness of said coating, and an average luminous reflectance factor Rv in the visible higher than 30%, and preferably higher than or equal to 35%.

It will be noted that this thickness of the low-index layers at least equal to 60% of the thickness of said coating is equivalent to a ratio of the thickness of the low-index layers/high-index layers higher than 1.55.

Preferably, in relation with any one of the preceding features and the two aforementioned embodiments:

said first material mostly (in a fraction by weight preferably higher than or equal to 80%) or exclusively consists of $SiO_2$, preferably of $SiO_2$ for the most internal layer of said stack and of $SiO_2$ or of a mixture of $SiO_2+Al_2O_3$ for at least one other said low-index layer (in particular of silica doped with alumina, the latter contributing to increasing the thermal resistance of the coating), and said second material mostly (in a fraction by weight preferably higher than or equal to 80%) or exclusively consists of a mineral oxide of at least one metal preferably chosen from $ZrO_2$, $Ta_2O_5$, $Nd_2O_5$, $Pr_2O_3$, $PrTiO_3$, $TiO_2$, $La_2O_3$ $Nb_2O_5$ and $Y_2O_3$ and even more preferably from $ZrO_2$ and $Ta_2O_5$.

Optionally, each low-index layer may furthermore contain a high-refractive-index ingredient, provided that the overall refractive index of the resulting layer is lower than 1.55.

When a low-index layer comprising a mixture of $SiO_2$ and $Al_2O_3$ is used, it preferably comprises from 1 to 10%, and even more preferably from 1 to 5% by weight $Al_2O_3$ with respect to the total weight of $SiO_2+Al_2O_3$ in this layer. For example, $SiO_2$ doped with 4% or less $Al_2O_3$ by weight or with 8% $Al_2O_3$ may be employed. Commercially available $SiO_2/Al_2O_3$ may be used, such as LIMA® sold by Umicore Materials AG (refractive index n=1.48-1.50 at 550 nm), or the substance L5® sold by Merck KGaA (refractive index n=1.48 at 500 nm).

Preferably, the most external layer (i.e. most distal layer with respect to the substrate) of said multilayer inorganic coating is silica-based, preferably comprising at least 80% by weight of silica as indicated above and even more preferably consisting of silica.

As for the or each high-index layer, it may furthermore contain silica or other low-refractive-index materials, provided that the overall refractive index of the resulting layer is higher than 1.55.

It will be noted that the choice of the number of layers for said multilayer inorganic coating may be guided by the reflectance characteristics sought for this coating, for example the desired reflectance value and the chromacity combined with the hue angle of the reflex.

A process for manufacturing, according to the invention, an ophthalmic lens such as defined above comprises depositing, in a vacuum chamber, said at least two low-index layers and said at least one high-index layer, without subjecting to an ion bombardment the exposed surface of that of said at least two low-index layers which is the closest to said substrate, or a proximal low-index layer, before deposition of said high-index layer that covers it.

It will be noted that this process of the invention is easy to implement and has only little impact on the cycle time of manufacture of the lenses, this being particularly relevant in the context of mass production with a view to limiting costs and power consumption, in particular.

Advantageously and according to said first embodiment of the invention, the layer that is internal to said stack may be said proximal low-index layer, which is directly covered by said adjacent high-index layer without being subjected beforehand to said ion bombardment.

In this case, the following may be deposited:

said low-index layer that is internal to said stack while introducing into said chamber a gas chosen from argon, krypton, neon, oxygen and a mixture of at least two of these gases, preferably oxygen, said at least one high-index layer with or without introduction of said gas into said chamber, and at least one other said low-index layer without introducing said gas into said chamber.

Generally, the multilayer inorganic coating of the ophthalmic lens according to the invention may be deposited on any substrate, and preferably on substrates made of organic glass, for example a thermoplastic or thermoset plastic.

Among thermoplastics suitable for substrates, mention may be made of (meth)acrylic (co)polymers, in particular polymethyl methacrylate (PMMA), thio(meth)acrylic (co) polymers, polyvinylbutyral (PVB), polycarbonates (PCs, including homopolycarbonates, copolycarbonates and sequenced copolycarbonates), polyesters such as polyethylene terephthalate (PET) or polybutylene terephthalate (PBT), polycarbonate/polyester copolymers, cyclo-olefin copolymers such as ethylene/norbornene copolymers or ethylene/cyclopentadiene copolymers and combinations thereof, and thermoplastic ethylene/vinyl acetate copolymers.

Among thermosets suitable for substrates, mention may be made of polyurethanes (PUs), polythiorethanes, polyol (allyl carbonate) (co)polymers, polyepisulfides, and polyepoxides.

Other thermosets suitable for substrates are (co)polymers of the acrylic type the refractive index of which is comprised between 1.5 and 1.65 and typically close to 1.6. These acrylic (co)polymers are obtained by polymerization of (meth)acrylic monomer blends and optionally allyl and/or vinyl aromatic monomers. The (meth)acrylate (i.e. acrylate or methacrylate) monomers may be monofunctional or multifunctional, typically bearing from 2 to 6 (meth)acrylate groups. These monomers may be aliphatic, cyclic, aromatic, polyalkoxylated, derivatives of compounds such as bisphenol and/or bear other functions such as epoxy, thioepoxy, hydroxyl, thiol, sulfide, carbonate, urethane and/or isocyanate functions.

Substrates may be obtained by polymerization of blends of the above monomers, or may even comprise blends of these polymers and (co)polymers.

Particularly recommended substrates are substrates obtained by (co)polymerization of diethylene glycol bis (allyl carbonate), sold, for example, under the trademark CR-39® by PPG Industries (ESSILOR ORMA® lenses), or thermoplastic substrates of polycarbonate type.

In certain applications, it is preferable for the front main face of the substrate to be coated with one or more functional coatings prior to the deposition of said multilayer inorganic coating. These functional coatings, which are conventionally used in optics, may be, non-limitingly, an anti-shock primer layer, an anti-abrasion and/or anti-scratch coating, a polarizing coating, a photochromic coating or a colored coating. Generally, this front main face of the substrate is thus coated with an anti-shock primer layer, an anti-abrasion coating and/or an anti-scratch coating, or an anti-shock primer layer coated with an anti-abrasion and/or anti-scratch coating.

Said multilayer inorganic coating according to the invention is preferably deposited on an anti-abrasion and/or anti-scratch coating, which may be any layer conventionally used as an anti-abrasion and/or anti-scratch coating in the field of ophthalmic lenses. These abrasion- and/or scratch-resistant coatings are preferably hard coatings based on poly(meth)acrylates or silanes generally comprising one or more mineral fillers intended to increase the hardness and/or the refractive index of the coating once cured, and they are preferably produced from compositions comprising at least one alkoxysilane and/or one hydrolysate thereof, for example obtained by hydrolysis with a hydrochloric acid solution and optionally condensation and/or curing catalysts. Mention may be made of coatings based on hydrolysates of epoxysilanes such as those described in documents FR 2702486 (EP 0614957), U.S. Pat. Nos. 4,211,823 and 5,015, 523.

One preferred composition for anti-abrasion and/or anti-scratch coatings is that disclosed in document FR 2702486 in the name of the Applicant. It comprises a hydrolysate of epoxy trialkoxysilane and dialkyl dialcoxysilane, colloidal silica and a catalytic amount of an aluminum-based curing catalyst such as aluminum acetylacetonate, the rest essentially consisting of solvents conventionally used for the formulation of such compositions. Preferably, the hydrolysate used is a hydrolysate of γ-glycidoxypropyltrimethoxysilane (GLYMO) and dimethyldiethoxysilane (DMDES).

The anti-abrasion and/or anti-scratch coating composition may be deposited on the main face of the substrate by dip coating or spin coating. It is then cured using the appropriate process (preferably thermally, or under UV). The thickness of the anti-abrasion and/or anti-scratch coating generally varies from 2 µm to 10 µm, and preferably from 3 µm to 5 µm.

Prior to the deposition of the anti-abrasion and/or anti-scratch coating, it is possible to deposit, on the substrate, a primer coating (also called a tie layer) that improves the resistance to shocks and/or the adhesion of subsequent layers in the final product. This coating may be any anti-shock primer layer conventionally used for articles made of transparent polymer, such as ophthalmic lenses.

Among preferred primer compositions, mention may be made of compositions based on thermoplastic polyurethanes, such as those described in documents JP 63-141001 and JP 63-87223, poly(meth)acrylic primer compositions, such as those described in document U.S. Pat. No. 5,015, 523, compositions based on thermoset polyurethanes, such as those described in document EP 0404111 and compositions based on poly(meth)acrylic latex or polyurethane latex, such as those described in documents U.S. Pat. No. 5,316, 791 and EP 0680492. Preferred primer compositions are compositions based on polyurethanes and compositions based on latex, in particular polyurethane latexes optionally containing polyester units. Among commercially available primer compositions suitable for the invention, mention may be made of the following: Wtcobond® 232, Wtcobond® 234, Wtcobond® 240, Wtcobond® 242, Neorez® R-962, Neorez® R-972, Neorez® R-986 and Neorez® R-9603.

It is also possible to use in the primer compositions blends of these latexes, in particular polyurethane latex and poly (meth)acrylic latex.

These primer compositions may be deposited by dip coating or spin coating then dried at a temperature of at least 70° C., possibly of as high as 100° C., and preferably of about 90° C., for a time of 2 minutes to 2 hours, and generally of about 15 minutes, in order to form primer layers having thicknesses, post-bake, of 0.2 µm to 2.5 µm, and preferably of 0.5 µm to 1.5 µm.

Before the multilayer inorganic coating is deposited on the substrate optionally coated for example with an anti-abrasion layer, it is possible to subject the surface of said optionally coated substrate to a chemical or physical activation treatment intended to increase the adhesion of the coating. This pre-treatment is generally carried out under vacuum. It may be a question of a bombardment with energetic species, for example an ion beam (ion precleaning or IPC), of a corona-discharge treatment, of an electron beam, of a UV treatment, or of a treatment by plasma under vacuum, generally an argon or oxygen plasma. It may also be a question of an acid or basic surface treatment and/or of a surface treatment with solvents (water or organic solvent).

The various layers of the multilayer inorganic coating and the optional underlayer are preferably deposited by vacuum deposition using one of the following techniques:
  (i) evaporation, optionally assisted by ion beam,
  (ii) ion-beam sputtering,
  (iii) cathode sputtering, or
  (iv) plasma-enhanced chemical vapor deposition.

These various techniques are described in the works "Thin Film Processes" and "Thin Film Processes II" Vossen & Kern, Ed., Academic Press, 1978 and 1991, respectively. One particularly recommended technique is the technique of vacuum evaporation.

Preferably and as indicated above, the deposition of each of the layers of said coating and the optional underlayer is carried out by vacuum evaporation.

The ophthalmic lens of the invention may be made antistatic, i.e. not retain and/or develop an appreciable electrostatic charge, by virtue of the incorporation of at least one electrically conductive layer in said multilayer inorganic coating. This electrically conductive layer is preferably located between two layers of said inorganic coating, and/or is adjacent to a high-refractive-index layer of this coating. Preferably, this electrically conductive layer is located immediately under a said low-refractive-index layer and ideally forms the penultimate layer of said coating, it being located immediately under the most external (low-index, e.g. silica-based) layer of said coating.

The electrically conductive layer must be sufficiently thin to not alter the transparency of said coating, and it is preferably manufactured from a highly transparent electrical conductor. In this case, its thickness varies preferably from 1 nm to 15 nm, and better still from 1 nm to 10 nm. This conductive layer preferably comprises an optionally doped metal oxide, chosen from oxides of indium, of tin, of zinc and mixtures thereof. Indium-tin oxide ($In_2O_3$:Sn for tin-doped indium oxide), aluminum-doped zinc oxide (ZnO: Al), indium oxide ($In_2O_3$) and tin oxide ($SnO_2$) are preferred. Even more preferably, this optically transparent conductive layer is a layer of indium-tin oxide (ITO) or a layer of tin oxide.

An ophthalmic lens according to the invention may also comprise complementary functionalities such as, non-limitingly:

coatings formed on the external (i.e. exposed) surface of said multilayer inorganic coating and capable of modifying its surface properties, such as for example an anti-fouling or anti-fog top coat (external coating);

specific filtration functionalities such as for example filtration of the UV, of the blue-violet (400 nm-460 nm) or IR, within a coating or directly integrated into the substrate; and/or a polarizing function.

By way of anti-fouling coatings, which may typically be hydrophobic and/or oleophobic and which have a thickness in general smaller than or equal to 10 nm, preferably of 1 nm to 10 nm, and better still of 1 nm to 5 nm, mention may be made of coatings of fluorosilane or fluorosilazane type which may be obtained by depositing a fluorosilane or fluorosilazane precursor, preferably comprising at least two hydrolysable groups per molecule. The precursor fluorosilanes preferably contain fluoropolyether groups and better still perfluoropolyether groups. These fluorosilanes are well known and are described, inter alia, in documents U.S. Pat. Nos. 5,081,192, 5,763,061, 6,183,872, 5,739,639, 5,922, 787, 6,337,235, 6,277,485 and EP 0933377. One preferred hydrophobic and/or oleophobic coating composition is sold by Shin-Etsu Chemical under the trade name KP 801 M®. Another preferred hydrophobic and/or oleophobic coating composition is sold by Daikin Industries under the trade name OPTOOL DSX®. It is a fluororesin comprising perfluoropropylene groups.

Thus, an ophthalmic lens according to the invention may for example comprise a substrate coated in succession on its front main face with an anti-shock primer layer, an anti-abrasion and/or anti-scratch layer, said multilayer inorganic coating according to the invention and a hydrophobic and/or oleophobic top coat.

As for the rear main face of the substrate, it may for example be coated, in succession, with an anti-shock primer layer, an anti-adhesion and/or anti-scratch layer, an antireflection coating preferably with a low reflectance in the domain of the UV and a hydrophobic and/or oleophobic coating.

Other features, advantages and details of the present invention will become apparent on reading the following description of a plurality of example embodiments of the invention, which are given by way of illustration and non-limitingly, the description being given with reference to the appended drawings, in which:

FIG. 1a is a schematic planar cross-sectional view, in a plane transverse to the front and rear faces of the substrate, of an inorganic coating according to the prior art comprising six high- and low-refractive-index layers, FIG. 1b is a schematic planar cross-sectional view in said transverse plane of an inorganic coating according to the invention comprising six high- and low-refractive-index layers, FIG. 2a is a schematic planar cross-sectional view in said transverse plane of an inorganic coating according to the prior art comprising two high- and low-refractive-index layers, FIG. 2b is a schematic planar cross-sectional view in said transverse plane of an inorganic coating according to the invention comprising three high- and low-refractive-index layers, FIG. 3a is a schematic planar cross-sectional view in said transverse plane of an inorganic coating according to the prior art comprising one high-refractive-index layer, FIG. 3b is a schematic planar cross-sectional view in said transverse plane of another inorganic coating according to the invention comprising three high- and low-refractive-index layers, and FIG. 4 is a graph showing the BAYER ISTM abrasion-resistance values obtained for the coatings of FIGS. 1a, 1b, 2a, 2b, 3a and 3b, respectively.

EXAMPLE EMBODIMENTS

The ophthalmic lenses employed in the following examples comprise a thermoplastic substrate made of a polycarbonate (PC) of trade name AIRWEAR (ESSILOR), of 65 mm diameter, of refractive index of 1.50, of power of −2.00 diopters and of 1.2 mm thickness.

The front main face of this substrate was coated with an anti-abrasion coating of composition defined in the following ranges and having a solid content of about 30%:

3-6% tetraethoxysilane (TEOS)

1-3% HCl 0.1N 10-20% γ-glycidoxypropyltrimethoxysilane (GLYMO)

1-30% glycidoxypropylmethyldiethoxysilane 30-40% of a dispersion containing 30% by weight of colloidal silica in methanol 10-20% of the solvent Dowanol PM 1.5% aluminum acetylacetonate (Al(AcAc))

0.1% the surfactant Fluorad FC 430.

Next, the one or more layers of a reflective inorganic coating according or not according to the invention were deposited by vacuum evaporation in a chamber without heating of the substrate (evaporation source: electron gun), then this inorganic coating was surmounted with a hydrophobic top coat of trade name DSX®.

The deposition tool was a Satis 1200DLF machine equipped with a Temescal (8 kV) electron gun for the evaporation of oxides.

The thickness of the or each reflective inorganic coating was measured by means of a quartz microbalance, and the spectral measurements were carried out using a Perkin-Elmer Lambda 850 variable incidence spectrophotometer with a URA (universal reflectance accessory).

To prepare the ophthalmic lenses to be tested, the following were implemented in succession:
- a step of introducing, into a vacuum deposition chamber, the substrate coated on its front face with the anti-abrasion coating,
- a step of pumping until a secondary vacuum was obtained,
- a step of activating the surface of the substrate with a beam of argon ions,
- stopping the ion irradiation,
- forming, on the anti-abrasion coating, the one or more layers of the reflective inorganic coating by successive evaporations, then
- a venting step.

To test the reflective inorganic coating of each lens thus prepared, the following were measured:
- its average luminous reflectance factor Rv in the visible domain defined in standard ISO 13666:1998 and measured according to standard ISO 8980-4 at an angle of incidence of 15°, and
- the Bayer ISTM abrasion-resistance value according to standard ISTM 02-002 with the abrasive material Alundum® ZF-12 (sold by Saint-Gobain).

Briefly, the Bayer ISTM abrasion test consists as known in abrading the front main face of each coated lens by exposing it to 600 cycles (150 cycles per minute for 4 minutes) of the abrasive material via a plate made to oscillate translationally with a reciprocal movement. Haze levels before and after abrasion were measured by calculating the ratio of the haze measured on an uncoated reference ophthalmic lens to the haze measured on the coated lens.

Six ophthalmic lenses L1 to L6 which each comprised a (PC) substrate 1 provided on its front main face with said anti-abrasion coating, which was surmounted with a reflective inorganic coating 2 (not according or according to the invention) deposited by vacuum evaporation and with the top coat 3 (made of DSX®), were tested, among which:
- the lens L1 according to the prior art schematically shown in FIG. 1*a*, which comprised by way of reflective inorganic coating 2 a coating containing six layers deposited by vacuum evaporation without oxygen in the chamber, said layers being, in succession, an internal layer of $Ti_3O_5$ of 75 nm thickness, a layer of $SiO_2$ of 45 nm thickness, a layer of $Ti_3O_5$ of 111 nm thickness, a layer of $SiO_2$ of 35 nm thickness, a layer of $Ti_3O_5$ of 90 nm thickness and an external layer of $SiO_2$ of 230 nm thickness, L1 presenting on its front face reflected light of emerald color;
- the lens L2 according to the invention schematically shown in FIG. 1*b*, which comprised by way of reflective inorganic coating 2 a coating containing six layers that were in succession an internal layer of $ZrO_2$ of 104 nm thickness, a layer of $SiO_2$ of 59 nm thickness, a layer of $ZrO_2$ of 64 nm thickness, a layer of $SiO_2$ of 103 nm thickness, a layer of $ZrO_2$ of 30 nm thickness and an external layer of $SiO_2$ of 219 nm thickness, these layers having been deposited by vacuum evaporation of ZrO in the presence of oxygen in the chamber for the layers of $ZrO_2$ and without oxygen in the chamber for the layers of $SiO_2$, L2 presenting on its front face reflected light of an emerald color analogous to that of the lens L1;
- the lens L3 according to the prior art schematically shown in FIG. 2*a*, which comprised by way of reflective inorganic coating 2 a coating containing two layers that were an internal layer of $CrO_2$ of 17 nm thickness, which was deposited by vacuum evaporation, and an external layer of $SiO_2$ of 20 nm thickness, which was deposited by vacuum evaporation, without oxygen introduced into the chamber for these two layers, L3 presenting on its front face reflected light of silvery color;
- the lens L4 according to the invention schematically shown in FIG. 2*b*, which comprised by way of reflective inorganic coating 2 a coating containing three layers that were in succession an internal layer of $SiO_2$ of 150 nm thickness, which was deposited by vacuum evaporation of $SiO_2$ in the presence of oxygen in the chamber and not subjected to an ion-bombardment treatment after its deposition, a layer of $ZrO_2$ of 17 nm thickness, which was deposited by vacuum evaporation of ZrO in the presence of oxygen in the chamber, and a layer of $SiO_2$ of 34 nm thickness, which was deposited by vacuum evaporation without introduction of oxygen into the chamber, L4 presenting on its front face reflected light of a silvery color analogous to that of the lens L3;
- the lens L5 according to the prior art schematically shown in FIG. 3*a*, which comprised by way of reflective inorganic coating 2 a coating containing a single layer made of $CrO_2$ of 45 nm thickness, which was deposited by vacuum evaporation without introduction of oxygen into the chamber, L5 presenting on its front face reflected light of an intense silvery color; and
- the lens L6 according to the invention schematically shown in FIG. 3*b*, which comprised by way of reflective inorganic coating 2 a coating containing three layers that were in succession an internal layer of $SiO_2$ of 150 nm thickness, which was deposited by vacuum evaporation of $SiO_2$ in the presence of oxygen in the chamber and not subjected to an ion-bombardment treatment after its deposition, a layer of $ZrO_2$ of 34 nm thickness, which was deposited by vacuum evaporation of ZrO in the presence of oxygen in the chamber, and a layer of $SiO_2$ of 27 nm thickness, which was deposited by vacuum evaporation without introduction of oxygen into the chamber, L6 presenting on its front face reflected light of an intense silvery color analogous to that of the lens L5.

Table 1 below details the total thicknesses $e_T$, the $e_{LI}/e_T$ ratios of the thickness(es) of the low-index layer(s), and the average luminous reflectance factors Rv in the visible domain that were obtained for the respective reflective inorganic coatings 2 of lenses L1 to L6.

TABLE 1

|  | L1 | L2 | L3 | L4 | L5 | L6 |
|---|---|---|---|---|---|---|
| $e_T$ (nm) | 586 | 579 | 37 | 201 | 45 | 211 |
| $e_{LI}/e_T$ (%) | 53 | 66 | 54 | 92 | 0 | 84 |
| Rv (%) | — | 35 | — | 8.5 | — | 15 |

The graph of FIG. 4 illustrates the average Bayer ISTM abrasion-resistance values measured according to standard ISTM 02-002 with the abrasive material Alundum® ZF-12, for each of the lenses L1 to L6.

FIG. 4 shows that the lenses L2, L4 and L6 according to the invention simultaneously have:
(i) a high average reflectance factor Rv in the visible (Rv higher than 8 for L4 and L6 and higher than 30 for L2),
(ii) a small total thickness (smaller than 580 nm for L2 and even smaller than 220 nm for L4 and L6), and
(iii) an average Bayer ISTM value higher than 10 (higher than 10.5 for L2 and even higher than 14 for L4 and substantially equal to 16 for L6).

These results also show that an $e_L/e_T$ ratio higher than 60% (i.e. an amount of low-index material such as silica clearly forming most of the stack) contributes to improving the hardness and the abrasion resistance of the inorganic coating.

Moreover, another comparative test was carried out that showed that ion bombardment with argon ions of the exposed surface of the low-index internal layer (made of $SiO_2$) of L4, which chemically modified this surface before the deposition (unchanged) of the layers of $ZrO_2$ and of $SiO_2$, had the negative effect of decreasing by one Bayer-ISTM point the improvement in the abrasion resistance of the thus modified coating of L4.

The synergistic effect according to the invention between the absence of treatment of the exposed surface of the low-index internal layer (e.g. made of $SiO_2$) deposited beforehand in the presence of a gas (e.g. oxygen) introduced into the chamber and the high-index layer (e.g. made of $ZrO_2$) covering it directly, is thus established.

The invention claimed is:

1. An ophthalmic sunglass lens having a reflective front face, the lens comprising a substrate having a front main face and a rear main face, said front main face being coated with a multilayer inorganic coating that has an average luminous reflectance factor Rv in the visible region equal to or higher than 4% and that consists of a stack comprising:
   at least two low-refractive-index layers that each consist of a first material of refractive index lower than 1.55, and
   at least one high-refractive-index layer that consists of a second material of refractive index higher than 1.55 and that is located between two said low-index layers that are adjacent in said stack,
wherein said coating has a thickness smaller than or equal to 600 nm and a Bayer ISTM abrasion-resistance value higher than 10.

2. The ophthalmic lens as claimed in claim 1, wherein said average luminous reflectance factor Rv in the visible region is equal to or higher than 8%.

3. The ophthalmic lens as claimed in claim 1, wherein said coating is devoid of any said low-index layer of thickness larger than or equal to 225 nm, and/or any said high-index layer of thickness larger than or equal to 105 nm.

4. The ophthalmic lens as claimed in claim 1, wherein said coating
   comprises at least one said low-index layer of thickness comprised between 100 nm and 200 nm and/or at least one said high-index layer of thickness smaller than or equal to 50 nm, and
   is devoid of any metal layer of thickness larger than 5 nm.

5. The ophthalmic lens as claimed in claim 1, wherein said coating is on at least one abrasion-resistant organic layer covering said substrate and comprises:
   two or three said low-index layers, and
   one to three said high-index layers.

6. The ophthalmic lens as claimed in claim 1, wherein said at least two low-index layers form at least 65% of the thickness of said coating.

7. The ophthalmic lens as claimed in claim 6, wherein said at least two low-index layers form at least 75% of the thickness of said coating.

8. The ophthalmic lens as claimed in claim 1, wherein the one of said at least two low-index layers which is the closest to said substrate, or proximal low-index layer, has an exposed surface that is covered by a said high-index layer and that is free of a product of a reaction between said first material and an ion bombardment.

9. The ophthalmic lens as claimed in claim 8, wherein said proximal low-index layer is internal a most layer of said stack and has a thickness comprised between 100 nm and 200 nm.

10. The ophthalmic lens as claimed in claim 9, wherein said proximal low-index layer results from the deposition of a precursor of said first material evaporated in a vacuum chamber with a gas introduced into said chamber that is chosen from argon, krypton, neon, oxygen and a mixture of at least two of these gases.

11. The ophthalmic lens as claimed in claim 10, wherein said gas introduced into said chamber is oxygen.

12. The ophthalmic lens as claimed in claim 1, wherein said coating is made up of three layers comprising, in succession, starting from closest to said substrate:
   an internal said low-index layer,
   an intermediate said high-index layer, and
   an external said low-index layer,
said coating having:
   a thickness smaller than 300 nm,
   a thickness of the low-index layers at least equal to 83% of the thickness of said coating, and
   an average luminous reflectance factor Rv in the visible region higher than 8%.

13. The ophthalmic lens as claimed in claim 12, wherein:
   the internal said low-index layer is of thickness comprised between 120 nm and 170 nm;
   the intermediate said high-index layer is of thickness comprised between 10 nm and 40 nm; and
   the external said low-index layer is of thickness comprised between 20 nm and 40 nm;
   said coating having:
      a thickness comprised between 150 nm and 250 nm; and
      a thickness of the low-index layers at least equal to 90% of the thickness of said coating.

14. The ophthalmic lens as claimed in claim 1, wherein said coating comprises four to six layers comprising, in succession, starting from closest to said substrate:
   an internal said high-index layer,
   a first intermediate said low-index layer,
   a first intermediate said high-index layer, and
   an external said low-index layer,
said coating having:
   a thickness comprised between 400 nm and 580 nm,
   a thickness of the low-index layers at least equal to 60% of the thickness of said coating, and
   an average luminous reflectance factor Rv in the visible region higher than 30%.

15. The ophthalmic lens as claimed in claim 14, wherein said coating comprises the four to six layers comprising, in succession, starting from closest to said substrate:
   the internal said high-index layer of thickness comprised between 80 nm and 120 nm;
   the first intermediate said low-index layer of thickness comprised between 40 nm and 80 nm;
   the first intermediate said high-index layer of thickness comprised between 40 and 80 nm;
   a second intermediate said low-index layer of thickness comprised between 80 and 120 nm;
   a second intermediate said high-index layer of thickness comprised between 20 nm and 50 nm; and
   the external said low-index layer of thickness comprised between 200 nm and 240 nm;
   said coating having an average luminous reflectance factor Rv in the visible region higher than or equal to 35%.

16. The ophthalmic lens as claimed in claim 1, wherein:
said first material comprises $SiO_2$ in a fraction by weight higher than or equal to 80%, and
said second material comprises a mineral oxide of at least one metal in a fraction by weight preferably higher than or equal to 80%.

17. The ophthalmic lens as claimed in claim 16, wherein:
said first material comprises, in a fraction by weight higher than or equal to 80%, of $SiO_2$ for a most internal layer of said stack and $SiO_2$ or of a mixture of $SiO_2$+$Al_2O_3$ for at least one other said low-index layer; and
said second material comprises, in a fraction by weight higher than or equal to 80%, a mineral oxide of at least one metal chosen from $ZrO_2$, $Ta_2O_5$, $Nd_2O_5$, $Pr_2O_3$, $PrTiO_3$, $TiO_2$, $La_2O_3$, $Nb_2O_5$ and $Y_2O_3$.

18. The ophthalmic lens as claimed in claim 17, wherein said second material consists of a mineral oxide of at least one metal chosen from $ZrO_2$ and $Ta_2O_5$.

19. A process for manufacturing an ophthalmic sunglass lens as claimed in claim 1, wherein the process comprises depositing, in a vacuum chamber, said at least two low-index layers and said at least one high-index layer, without subjecting to an ion bombardment an exposed surface of the one of said at least two low-index layers which is the closest to said substrate, or proximal low-index layer, before deposition of a high-index layer that covers it.

20. The process as claimed in claim 19, wherein a layer that is internal to said stack is said proximal low-index layer, which is directly covered by said adjacent high-index layer without being subjected beforehand to said ion bombardment.

21. The process as claimed in claim 20, wherein the following are deposited:
said low-index layer that is internal to said stack while introducing into said chamber a gas chosen from argon, krypton, neon, oxygen and a mixture of at least two of these gases,
said at least one high-index layer with or without introduction of said gas into said chamber, and
at least one other said low-index layer without introducing said gas into said chamber.

22. The process as claimed in claim 21, wherein said gas is oxygen.

* * * * *